US008315148B2

(12) United States Patent
Lipka et al.

(10) Patent No.: US 8,315,148 B2
(45) Date of Patent: Nov. 20, 2012

(54) METHOD, APPARATUS, AND COMPUTER PRODUCT FOR GENERATING AN SC-FDMA SIGNAL

(75) Inventors: Dietmar Lipka, Berg (DE); Stefan Mueller-Weinfurtner, Nürnberg (DE)

(73) Assignee: Telefonaktiebolaget LM Ericsson (publ), Stockholm (CH)

( * ) Notice: Subject to any disclaimer, the term of this patent is extended or adjusted under 35 U.S.C. 154(b) by 289 days.

(21) Appl. No.: 12/644,761

(22) Filed: Dec. 22, 2009

(65) Prior Publication Data

US 2010/0195479 A1    Aug. 5, 2010

Related U.S. Application Data

(60) Provisional application No. 61/140,228, filed on Dec. 23, 2008.

(30) Foreign Application Priority Data

Jul. 28, 2009  (EP) .................................. 09009718

(51) Int. Cl.
*H04J 11/00* (2006.01)
(52) U.S. Cl. ...................................................... 370/203
(58) Field of Classification Search .................. 370/203, 370/206, 208, 281, 480; 375/260
See application file for complete search history.

(56) References Cited

U.S. PATENT DOCUMENTS

| 2008/0043671 A1* | 2/2008 | Moon et al. ................... 370/329 |
| 2009/0164748 A1* | 6/2009 | Mansour ....................... 711/202 |
| 2010/0095189 A1* | 4/2010 | Park et al. .................... 714/794 |
| 2010/0226324 A1* | 9/2010 | Lee et al. ..................... 370/329 |

OTHER PUBLICATIONS

3GPP TS 36.211, Mar. 2008, version 8.2.0, pp. 1-65.*
3GPP TS 36.211 v8.7.0 (May 2009); 3$^{rd}$ Generation Partnership Project; Technical Specification Group Radio Access Network; Evolved Universal Terrestrial Radio Access (E-UTRA); Physical Channels and Modulation (Release 8).

* cited by examiner

*Primary Examiner* — Abdullah Riyami
(74) *Attorney, Agent, or Firm* — Nixon & Vanderhye P.C.

(57) ABSTRACT

A technique for generating a Single-Carrier Frequency Division Multiple Access (SC-FDMA) signal based on a Constant Amplitude Zero Auto-Correlation (CAZAC) sequence is disclosed. A method embodiment of this technique comprises generating a frequency domain representation of the CAZAC sequence by providing an analytical representation of the CAZAC sequence in the frequency domain with an integer phase term and calculating the integer phase term in a recursive manner for each of a plurality of frequency domain samples of the CAZAC sequence. The resulting frequency domain representation of the CAZAC sequence is then mapped to a pre-determined frequency location before being transformed into the time domain to obtain a time domain representation of the SC-FDMA signal. The SC-FDMA signal may be a random access signal for transmission on a Physical Random Access Channel (PRACH).

16 Claims, 3 Drawing Sheets

US 8,315,148 B2

METHOD, APPARATUS, AND COMPUTER PRODUCT FOR GENERATING AN SC-FDMA SIGNAL

This application claims benefit of U.S. Provisional Application No. 61/140,228 filed 23 Dec. 2008 and claims priority to European Patent Application No. 09009718-9 filed 28 Jul. 2009, the entire contents of each of which are hereby incorporated by reference.

TECHNICAL FIELD

The present disclosure generally relates to generation of Single-Carrier Frequency Division Multiple Access (SC-FDMA) signals. In particular, a technique for generating SC-FDMA signals based on symbol sequences giving rise to a Constant Amplitude Zero Auto-Correlation (CAZAC) waveform is disclosed.

BACKGROUND

In multi-transmitter communications networks, channel access techniques allow multiple transmitters connected to the same physical channel to share its transmission capacity. Various such channel access techniques are known in the art. For example, in second generation communications systems according to the Global System for Mobile communications (GSM) standard, Time Division Multiple Access (TDMA) techniques are utilized to divide a specific frequency channel into individual time slots assigned to individual transmitters. In third generation communications systems, Code Division Multiple Access (CDMA) techniques divide channel access in the signal space by employing a combination of spread spectrum operations and a special coding scheme in which each transmitter is assigned an individual code. The next advance in wireless communications systems considers Orthogonal Frequency Division Multiple Access (OFDMA) techniques to achieve still higher bit rates.

One major advantage of OFDMA over other channel access techniques is its robustness in the presence of multi-path signal propagation. On the other hand, the waveform of OFDMA signals exhibits very pronounced envelope fluctuations resulting in a high Peak-to-Average Power Ratio (PAPR). Signals having a high PAPR require highly linear power amplifiers to avoid excessive inter-modulation distortion, and these power amplifiers have to be operated with a large back-off from their peak power. These demands result in a low power efficiency, which places a significant burden specifically on battery operated transmitters as utilized in mobile telephones and similar portable user equipment.

The disadvantage of a high PAPR inherent to OFDMA is to a certain extent overcome by the Single Carrier Frequency Division Multiple Access (SC-FDMA) technique, which can be regarded as a modification of the OFDMA technique. The Third Generation Partnership Project (3GPP) is considering using both OFDMA and SC-FDMA in next generation communications systems currently standardized in the Long Term Evolution (LTE) project. According to section 5 of the 3GPP Technical Specification TS 36.211 "Physical Channels and Modulation", V8.7.0 of May 2009, SC-FDMA will be implemented in the LTE user equipment for the uplink direction towards the access network. OFDMA, on the other hand, will be used for the downlink direction from the LTE access network towards the user equipment.

An exemplary realization of a conventional SC-FDMA modulator stage 10 for an LTE user equipment is schematically illustrated in FIG. 1. The modulator stage 10 receives as input signal a multilevel sequence of complex-valued symbols in one of several possible modulation formats such as Binary Phase Shift Keying (BPSK) or 16 level Quadrature Amplitude Modulation (16-QAM). The modulation symbols are received in blocks containing M data symbols each. Every block of M data symbols is initially subjected to an M-point Discrete Fourier Transform (DFT) in a DFT block 12. The DFT block 12 spreads the M data symbols over N frequency points or subcarriers (M<N) to obtain a frequency domain representation of the M data symbols that is input to a mapping block 14. The mapping block 14 outputs a set of N complex-valued subcarrier amplitudes. Exactly M of the amplitudes (corresponding to the M data symbols) will be non-zero, while the remaining amplitudes have been set to zero.

The subcarrier amplitudes output by the mapping block 14 are re-transformed by an Inverse Fast Fourier Transform (IFFT) block 16 into a time domain signal. The resulting time domain signal may then be subjected to a phase rotation to correct any phase errors introduced by the previous signal processing operations in blocks 12 to 16. Furthermore, a Cyclic Prefix (CP) will be inserted into the output signal of the IFFT block 16. The CP provides a guard-time between two sequentially transmitted symbol blocks to reduce inter-block interference caused by multi-path propagation.

Except for an omission of the DFT block 12 used to spread the bits of the input symbols over the available subcarriers, an OFDMA modulator stage has a similar configuration as the SC-FDMA modulator stage 10 shown in FIG. 1. For this reason, SC-FDMA is sometimes also interpreted as DFT-spread OFDMA.

The modulation process described above for data symbols is also applied to random access preamble symbols when generating a random access signal for the Physical Random Access Channel (PRACH) as defined in section 5.7 of TS 36.211. The random access signal is used upon an initial access in a cell for uplink synchronization and for getting attached to the network for subsequent data traffic.

The generation of the random access signal starts with generation of a Zadoff-Chu sequence having a length of either 139 or 839 complex-valued symbols (also called samples) which, when modulated onto a radio carrier, give rise to an electromagnetic signal of constant amplitude. Signals comprising cyclically shifted versions of a specific Zadoff-Chu sequence do not cross-correlate (i.e., remain orthogonal to each other) when recovered at a receiver, provided that the cyclical shift is greater than a specific threshold defined by propagation delay and multi-path delay spread. An electromagnetic signal carrying a Zadoff-Chu sequence thus has a CAZAC waveform.

Once a Zadoff-Chu sequence of the required length has been generated, the resulting random access preamble symbols are transformed by the DFT block 12 of FIG. 1 to the frequency domain. Since both 139 and 839 are prime numbers, the mathematical DFT operations cannot be simplified or reduced (using, e.g., a Fast Fourier Transform, or FFT). After the mapping block 14 has applied a mapping operation to the output of the DFT block 12, the IFFT block 16 performs an IFFT of size 4.096 (in the case of 139 samples) or 24.576 (in the case of 839 samples).

It has been determined that the SC-FDMA modulator stage 10 consumes considerably more hardware resources when processing a random access signal compared to the processing of conventional data signals.

SUMMARY

Accordingly, it is an object of the present invention to provide an alternative SC-FDMA signal generation technique that consumes less hardware resources.

According to a first aspect, a method of generating an SC-FDMA signal based on a given CAZAC sequence is provided. The method comprises generating a frequency domain representation of the CAZAC sequence including providing an analytical representation of the CAZAC sequence in the frequency domain with an integer phase term, and calculating the integer phase term in a recursive manner for each of a plurality of frequency domain samples of the CAZAC sequence. The resulting frequency domain representation of the CAZAC sequence is mapped to a pre-determined frequency location, and the mapped frequency domain representation is transformed into the time domain to obtain a time domain representation of the SC-FDMA signal.

For the transformed CAZAC sequence (i.e., its frequency domain representation), an analytical solution can be derived. This solution can be calculated in a computationally efficient manner using recursive techniques. As a result, a frequency domain representation of the CAZAC sequence can be obtained without having to perform one or more DFT operations. This approach is particularly useful in case the length of the CAZAC sequence is a prime number, but can also be employed in other cases.

The analytical representation of the CAZAC sequence can have various forms. For example, the analytical representation $X[k]$ of the CAZAC sequence may essentially have the form of $$X[k] = e^{j\frac{2\pi}{N_{ZC}}p[k]},$$

with k being a frequency domain counting parameter (e.g., in integer variable), $N_{ZC}$ being an integer value indicative of a length of the given CAZAC sequence, and $p[k]$ being the integer phase term. The analytical representation may additionally comprise one or more phase factors and/or other terms not influencing this general form.

The analytical representation has an integer phase term that can advantageously be calculated in a recursive manner. In this regard, integer-based calculation operations may be used to prevent any error accumulation. In certain analytical representations of the CAZAC sequence, the integer phase term $p[k]$ may essentially have the form of $$p[k]=C_v k+2^{-1}u^{-1}\cdot k(k+u),$$

$C_v$, u being parameters uniquely identifying the given CAZAC sequence, and $u^{-1}$ and $2^{-1}$ being the modulo inverses of u and of 2, respectively.

Generation of the frequency domain representation of the CAZAC sequence may comprise determining an individual frequency domain sample of the CAZAC sequence on the basis of the integer phase term calculated for this sample. To this end, a table look-up operation may be implemented. For example, a specific frequency domain sample $X[k]$ may be determined as an output parameter of a table look-up operation using the integer phase term calculated for this sample as an input parameter.

The recursive calculation of the integer phase term may include a modulo operation to limit an integer range of the integer phase term. Such a modulo operation is particularly beneficial if combined with a table look-up operation as discussed above since the table content can be limited to a manageable size.

The integer phase term may be calculated using a single recursion or using two or more nested recursions depending on the specific analytical frequency domain representation of the CAZAC sequence provided. In the exemplary case of two nested recursions, the two recursions may be defined as $$p[k]=(p[k-1]+q[k]) \bmod N_{ZC} \text{ and}$$

$$q[k]=(q[k-1]+u^{-1}) \bmod N_{ZC},$$

with p(k) being the integer phase term, k being a frequency domain counting parameter, u being a parameter identifying the given CAZAC sequence, and $N_{ZC}$ being an integer value indicative of a length of the given CAZAC sequence.

Initialization values of the two nested recursions may be selected as:

$$p[0]=0 \text{ and}$$

$$q[0]=(C_v+2^{-1}u^{-1}\cdot(u-1)) \bmod N_{ZC},$$

with $C_v$ being a parameter identifying the given CAZAC sequence.

The CAZAC sequence may be a Zadoff-Chu sequence or any Zadoff-Chu-like sequence exhibiting a CAZAC wave form when modulated onto a carrier. The SC-FDMA signal can be a random access signal for transmission on the PRACH of a mobile communication network supporting SC-FDMA, such as an LTE or LTE-Advanced network.

The techniques presented herein may be realised in the form of software, in the form of hardware, or using a combined software/hardware approach. As regards a software aspect, a computer program product comprising program code portions for performing the steps presented herein when the computer program product is run on one or more computing devices may be provided. The computer program product may be stored on a computer-readable recording medium such as a memory chip, a CD-ROM, a hard disk, and so on. Moreover, the computer program product may be provided for download onto such a recording medium.

According to a further aspect, a device for generating an SC-FDMA signal based on a given CAZAC sequence is provided. The device comprises a generator adapted to generate a frequency domain representation of the CAZAC sequence based on an analytical representation of the CAZAC sequence in the frequency domain with an integer phase term, wherein the generator calculates the integer phase term in a recursive manner for each of a plurality of frequency domain samples of the CAZAC sequence, The device further comprises a mapper adapted to map the resulting frequency domain representation of the CAZAC sequence to a pre-determined frequency location and a transformator adapted to transform the mapped frequency domain representation into the time domain to obtain a time domain representation of the SC-FDMA signal. The transformator may comprise IFFT or IDFT (Inverse Discrete Fourier Transform) functionalities.

The device may additionally comprise a storage with a look-up table. The generator may thus determine an individual frequency domain sample of the CAZAC sequence based on the integer phase term calculated for this sample by accessing the look-up table using the integer phase term as input parameter.

Also provided is a user terminal comprising such a device. The user terminal may be configured to support SC-FDMA and may thus be compliant with LTE or LTE-Advanced. Possible implementations of the user terminal include mobile telephones, network or data cards, portable or stationary computers with network access capabilities and so on.

BRIEF DESCRIPTION OF THE DRAWINGS

Further aspects and advantages of the technique presented herein will become apparent from the following description of preferred embodiments and the drawings, wherein.

DETAILED DESCRIPTION

In the following description of preferred embodiments, for purposes of explanation and not limitation, specific details are set forth (such as particular signal processing components and sequences of steps) in order to provide a thorough understanding of the present invention. It will be apparent to one skilled in the art that the techniques described herein may be practiced in other embodiments that depart from these specific details. For example, while the following embodiments will primarily be described in context with random access signal generation, the present invention can also be implemented in other signal scenarios operating on the basis of CAZAC sequences. While the embodiments will relate to an exemplary LTE implementation, it will be readily apparent that the techniques described herein may also be implemented in other communications networks such as LTE-Advanced networks.

Moreover, those skilled in the art will appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in context with methods and devices, the invention may also be embodied in a computer program product as well as in a system comprising a computer processor and a memory coupled to the processor, wherein the memory is encoded with one or more programs that may perform the services, functions and steps disclosed herein.

Figure 2:
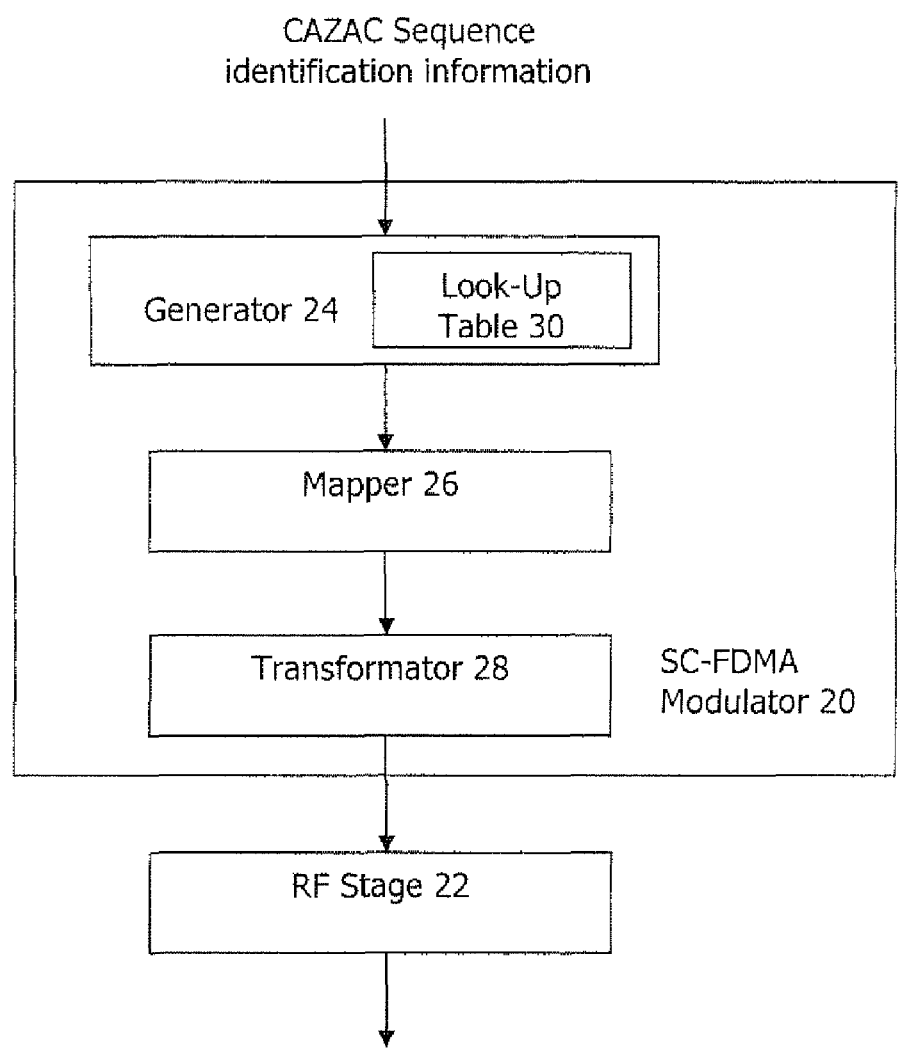
FIG. 2 schematically illustrates a transmitter stage including an embodiment of a device for generating a random access signal.

FIG. 2 shows an embodiment of a transmitter stage 18 to be incorporated as a network card or data stick in a stationary or portable computer. The transmitter stage 18 comprises an SC-FDMA modulator 20 and a Radio Frequency (RF) stage 22. The RF stage 22 is capable of up-converting an output signal of the SC-FDMA modulator 20 into the RF range and of amplifying the up-converted signal prior to transmission via one or more antennas (not shown). It will be understood that the transmitter stage 18 may comprise further components not shown in FIG. 2.

In an exemplary LTE scenario the SC-FDMA modulator 20 of FIG. 1 performs the same basic SC-FDMA processing operations as described above with reference to FIG. 1. To this end, the SC-FDMA modulator 20 comprises a generator 24 adapted to generate a frequency domain representation of one or more symbol blocks to be transmitted, a mapper 28 adapted to map the resulting frequency domain representation to a pre-determined frequency location (i.e., to pre-determined sample points or subcarriers in the frequency domain), and a transformator 30 adapted to transform the mapped frequency domain representation into the time domain. While the mapper 28 and the transformator 30 may be realized in the same manner as the mapping block 14 and the IFFT block 16 of FIG. 1, the generator 24 substantially differs from the DFT block 12 of FIG. 1. In particular, the generator 24 does not make use of a DFT to generate the frequency domain representation of the symbol blocks input to the SC-FDMA modulator 20. In other words, the SC-FDMA modulation approach discussed herein does not require a computationally complex DFT operation to transform the input symbol blocks into the frequency domain.

In the following, the operation of the SC-FDMA modulator 20 of FIG. 2 will be described with reference to the schematic flow diagram 300 of FIG. 3. The operation will be explained for a random access signal to be transmitted on the PRACH in an LTE network. As mentioned above, LTE random access signal generation is described in section 5.7 of TS 36.211. The LTE random access signal comprises a random access preamble generated from a CAZAC sequence of the Zadoff-Chu type.

The input sequence for PRACH generation is defined in section 5.7.2 of TS 36.211 by the discrete time domain function $$x_{u,v}[n] = x_u[(n+C_v) \bmod N_{ZC}],$$

where $$x_u[n] = e^{-j\frac{2\pi}{N_{ZC}}un(n+1)/2}$$

is the root or base Zadoff-Chu function of length $N_{ZC}$ with the root index u. $C_v$ is a cyclic shift to generate distinguishable PRACH sequences. u and C thus uniquely identify a specific Zadoff-Chu sequence (and random access preamble).

Figure 1:
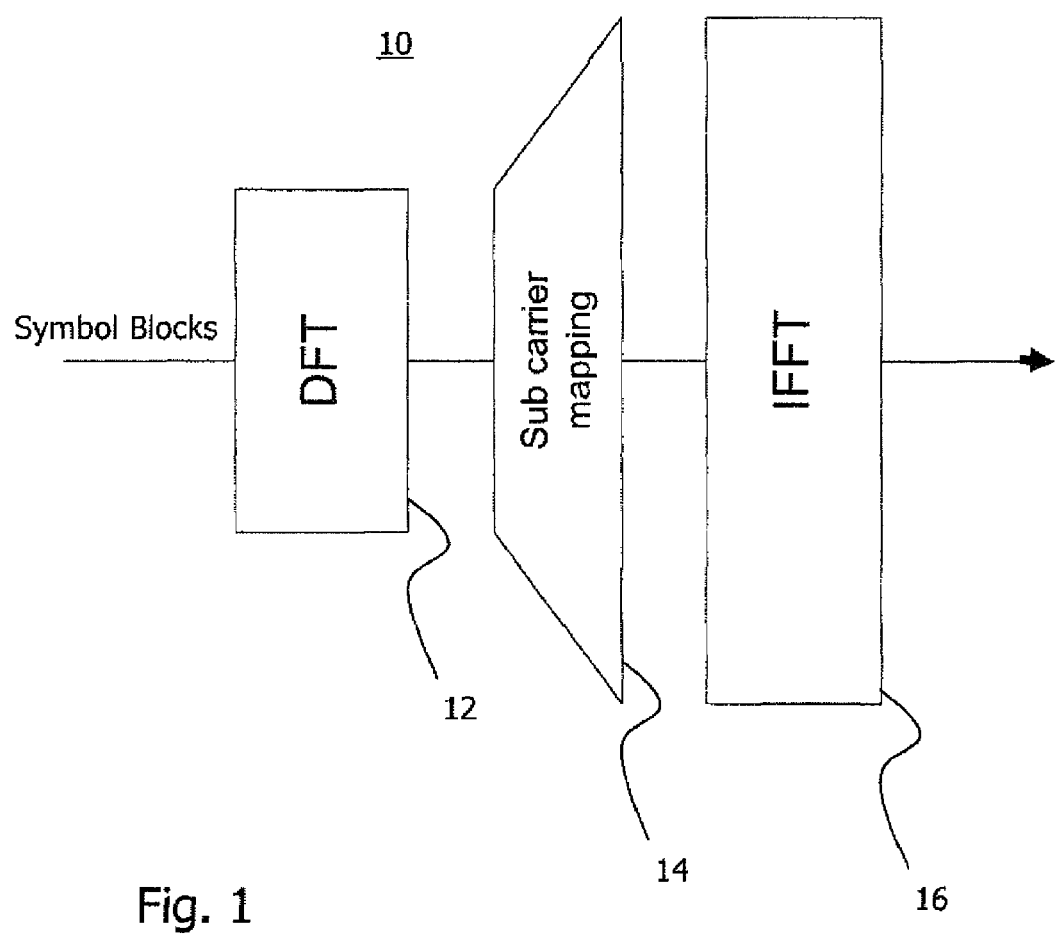
FIG. 1 schematically illustrates an exemplary implementation of an SC-FDMA modulator stage.

In the conventional scenario illustrated in FIG. 1, $x_u[n]$ has to be transformed into the frequency domain in the next step by DFT block 12. Since the possible lengths $N_{ZC}$ of the input sequence (i.e., 839 and 139) are prime numbers, it is not possible to use FFT techniques. Especially for $N_{ZC}=839$ this results in an extremely inefficient computational algorithm.

However a closed analytical solution for the transformed Zadoff-Chu sequence in the frequency domain can be given by $$X_{u,v}[k] = \sqrt{N_{ZC}}\, e^{j\phi_u} \cdot e^{j\frac{2\pi}{N_{ZC}}k\left(C_v+(k+u)2^{-1}u^{-1}\right)}.$$

$u^{-1}$ is the modulo inverse of u, i.e., it fulfills the equation $(u \cdot u^{-1}) \bmod N_{ZC} = 1$.

In the same way $2^{-1}$ is the modulo inverse of 2, which equates to $2^{-1}=420$ for $N_{ZC}=839$.

In the above formula, the constant phase factor $$e^{j\phi_u} = \frac{1}{\sqrt{N_{ZC}}}\sum_{n=0}^{N_{ZC}-1} x_{u,v}[n]$$

can easily be calculated and will thus be ignored in the following description of the operation of the SC-FDMA modulator 20.

Figure 3:
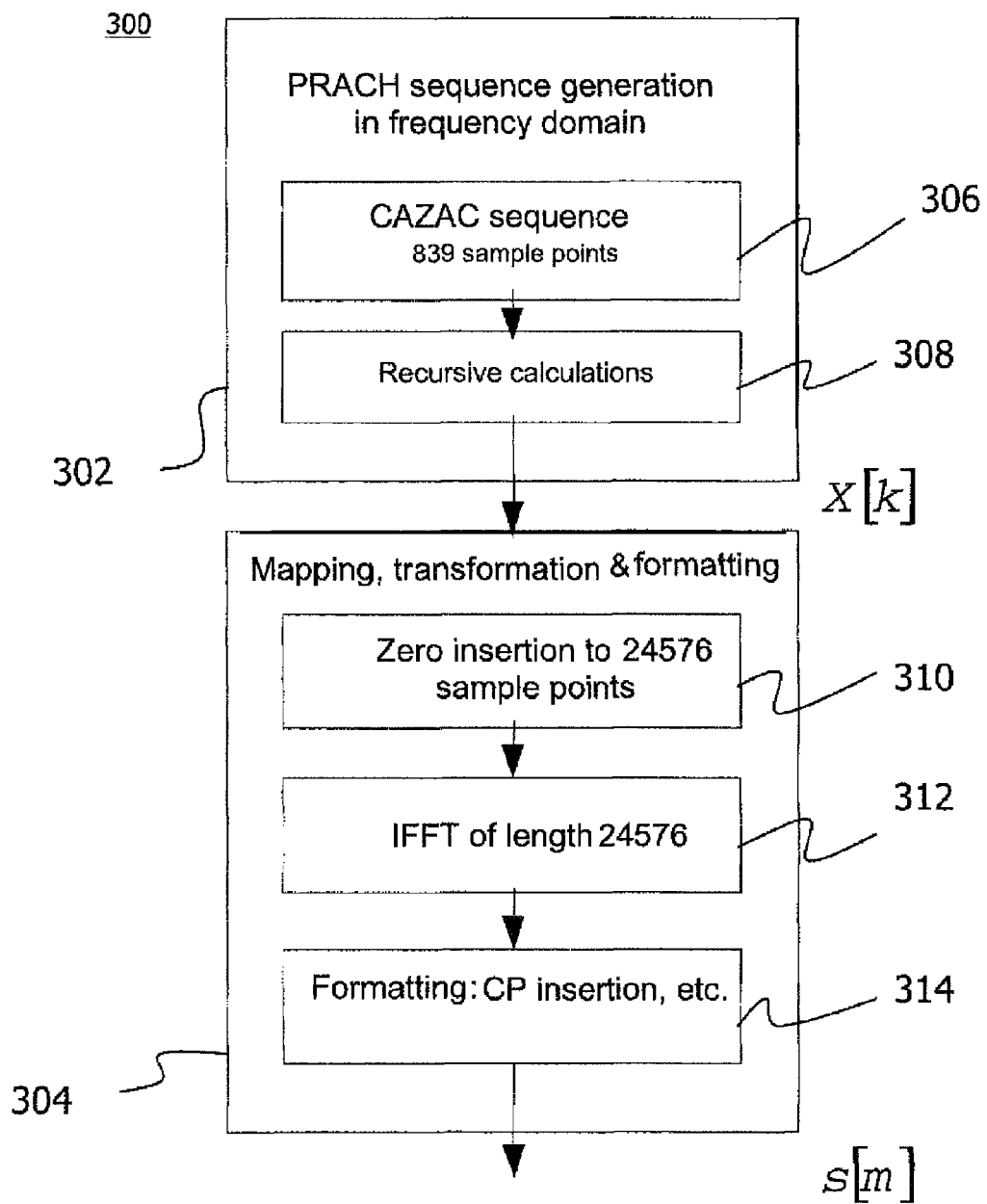
FIG. 3 shows a flow diagram according to a method embodiment.

As illustrated by the flow diagram 300 of FIG. 3, the operation of the SC-FDMA modulator 20 can generally be divided into two stages. In a first stage 302, the Zadoff-Chu sequence for the LTE PARCH is directly generated in the frequency domain by the generator 24. In a second stage 304, the mapper 26 and the transformator 28 apply the conventional SC-FDMA mapping, transformation and formatting operations to the frequency domain representation of the Zadoff-Chu sequence generated in the first stage 302.

The operation of the generator 24 starts with identification of the specific Zadoff-Chu sequence to be generated in step 306. To this end identification information comprising root index u and cyclic shift $C_v$ is evaluated as generally described in section 5.7.2 of TS 36.211. The identification information may be received from the network and/or determined locally.

Once the specific Zadoff-Chu sequence required for the random access preamble has been identified in step 306, the above analytical solution for $X_{u,v}[k]$ will be calculated. The direct computation of (the phase term for) $X_{u,v}[k]$ is still quite resource consuming, especially when performed on a DSP.

It has, however, been found that number of arithmetic operations can considerably be reduced by solving the integer part of the phase term in the exponential in a recursive manner as illustrated by step 308 in FIG. 3. With a small re-arrangement this term can be written as $$p[k]=C_v k+2^{-1}u^{-1}\cdot k(k+u).$$

Using the recursion $$k(k+u)=\sum_{i=1}^{k}(2i+u-1)$$

it can be seen that $$p[k]=p[k-1]+q[k]$$

with $$q[k]=C_v+2^{-1}u^{-1}\cdot(2k+u-1).$$

q[k] can be represented by a second recursion $$q[k]=q[k-1]+u^{-1}$$

making use of the relation $2\cdot 2^{-1}=1$.

Consequently, initializing with $$p[0]=0$$

and $$q[0]=(C_v+2^{-1}u^{-1}\cdot(u-1))\bmod N_{ZC},$$

the integer part of the PRACH input sequence in the frequency domain $X_{u,v}[k]$ is computed very efficiently by two nested recursions $$q[k]=(q[k-1]+u^{-1})\bmod N_{ZC}$$

$$p[k]=(p[k-1]+q[k])\bmod N_{ZC}.$$

By taking the modulo $N_{ZC}$ in each iteration step, it is ensured that $N_{ZC}$ has to be subtracted at most one time, which is the most trivial modulo reduction possible and further reduces the computational effort.

Finally, after each iteration $$X_{u,v}[k]=e^{j\frac{2\pi}{N_{ZC}}p[k]}$$

will be calculated. To avoid calculations of sine and cosine values for the exponential function a look-up table 30 as shown in FIG. 2 may be used. Thanks to the modulo operation, p[k] is an integer number in the range of 0 ... 838 (for $N_{ZC}=839$). As a result, a comparatively short table with only 839 non-trivial sine and cosine values will be sufficient.

With the above approach, the initially complicated task of generating a Zadoff-Chu sequence is reduced to 2*838 integer additions and modulo-$N_{ZC}$ operations. The modulo operations can be done by conditional integer subtractions, i.e. less than 2*838 operations are needed in stage 302.

The recursive calculation approach in step 308 has the advantage that due to the integer based operations, no error accumulation can occur. Moreover, multiplications are omitted and only simple modula operations are performed within the recursive loop. Consequently, the Zadoff-Chu sequence for a specific random access preamble is can be directly generated in the frequency domain in a computationally efficient manner and without relying on a DFT operation. The processing in stage 302 can be applied to any Zadoff-Chu sequence used within the LTE standard and also to other, Zadoff-Chu like CAZAC sequences outside the LTE standard.

Once the analytical solution for the transformed Zadoff-Chu sequence has been obtained in stage 302, the resulting frequency domain representation of the Zadoff-Chu sequence is output to the mapping, transformation and formatting stage 304 as shown in FIG. 3. Upon receipt of the transformed Zadoff-Chu sequence, the mapper 26 maps in step 310 the frequency domain representation of the Zadoff-Chu sequence (in the form of typically 839 subcarrier amplitudes) to a number of sample points (or subcarriers) defined, inter alia, by the current carrier or cell bandwidth. The remaining sample points will be set to zero. In the exemplary case of 24.576 sample points, exactly 839 samples points will thus be non-zero. After the mapping step 310, the frequency domain representation of the Zadoff-Chu sequence has been moved to its correct frequency location.

In a following step 312, the transformator 28 applies an IFFT of length 24.576 to the output of the mapper 26. As a result, the mapped frequency domain representation of the Zadoff-Chu sequence is transformed into the time domain to obtain a time domain representation of the random access signal.

Additional formatting operations are performed by either the transformator 28 or another component located downstream of the transformator 28 (and not shown in FIG. 2) in step 314. Such formatting operations may comprise subjecting the random access signal to a phase rotation to correct any phase errors introduced by the previous processing operations. Additionally, a cyclic prefix may be inserted to provide a guard-interval between two sequential transmissions. The resulting random access signal s [m] is then output to the RF stage 22 of FIG. 2 for being up-converted, amplified and transmitted.

As has become apparent from the above embodiment, generating the Zadoff-Chu sequence (or any other CAZAC sequence) directly in the frequency domain using a recursive approach is computationally efficient. In particular, DFT processing can be avoided or at least reduced.

It is believed that many advantages of the present invention will be fully understood from the forgoing description, and it will be apparent that various changes may be made in the form, construction and arrangement of the exemplary aspects thereof without departing from the scope of the invention or without sacrificing all of its advantages. Because the invention can be varied in many ways, it will be recognized that the invention should be limited only by the scope of the following claims.

The invention claimed is:

1. A method of generating a Single-Carrier Frequency Division Multiple Access, or SC-FDMA, signal based on a given Constant Amplitude Zero Auto-Correlation, or CAZAC, sequence, the method comprising:
   generating a frequency domain representation of the CAZAC sequence, comprising:

providing an analytical representation of the CAZAC sequence in the frequency domain with an integer phase term; and calculating the integer phase term in a recursive manner for each of a plurality of frequency domain samples of the CAZAC sequence;

mapping the resulting frequency domain representation of the CAZAC sequence to a pre-determined frequency location; and transforming the mapped frequency domain representation into the time domain to obtain a time domain representation of the SC-FDMA signal.

2. The method of claim 1, wherein the analytical representation X [k] of the CAZAC sequence has essentially the form of $$X[k] = e^{j\frac{2\pi}{N_{ZC}}p[k]},$$

k being a frequency domain counting parameter, $N_{ZC}$ being an integer value indicative of a length of the given CAZAC sequence, and p[k] being the integer phase term.

3. The method of claim 1, wherein the integer phase term p[k] has essentially the form of $$p[k]=C_v k+2^{-1}u^{-1}\cdot k(k+u),$$

$C_v$, u being parameters uniquely identifying the given CAZAC sequence, and k being a frequency domain counting parameter.

4. The method of claim 1, wherein generating the frequency domain representation of the CAZAC sequence further comprises determining an individual frequency domain sample of the CAZAC sequence based on the integer phase term calculated for this sample.

5. The method of claim 4, wherein determining the frequency domain sample comprises at least one table look-up operation using the integer phase term calculated for this sample as an input parameter.

6. The method of claim 1, wherein the recursive calculation includes a modulo operation to limit an integer range of the integer phase term.

7. The method of claim 1, wherein the integer phase term is calculated using two nested recursions.

8. The method of claim 7, wherein the two nested recursions are defined as:

$$p[k]=(p[k-1]+q[k]) \bmod N_{ZC} \text{ and}$$

$$q[k]=(q[k-1]+u^{-1}) \bmod N_{ZC},$$

p(k) being the integer phase term, q[k] an intermediate variable of the two nested recursions, k being a frequency domain counting parameter, u being a parameter identifying the given CAZAC sequence, and $N_{ZC}$ being an integer value indicative of a length of the given CAZAC sequence.

9. The method of claim 8, wherein initialization values of the two nested recursions are selected as:

$$p[0]=0 \text{ and}$$

$$q[0]=(C_v+2^{-1}u^{-1}\cdot(u-1)) \bmod N_{ZC},$$

$C_v$ being a parameter identifying the given CAZAC sequence.

10. The method of claim 1, wherein the CAZAC sequence is a Zadoff-Chu sequence.

11. The method of claim 1, wherein the CAZAC sequence comprises N samples, with N being a prime number.

12. The method of claim 1, wherein the SC-FDMA signal is a random access signal, and further comprising transmitting the random access signal on a physical random access channel that belongs to a mobile communications network supporting SC-FDMA.

13. A computer program product stored on a non-transitory computer-readable recording medium for performing the steps of claim 1 when executed by a processor.

14. An apparatus for generating a Single-Carrier Frequency Division Multiple Access, or SC-FDMA, signal based on a given Constant Amplitude Zero Auto-Correlation, or CAZAC, sequence, the device comprising:

a generator configured to generate a frequency domain representation of the CAZAC sequence based on an analytical representation of the CAZAC sequence in the frequency domain with an integer phase term, wherein the generator calculates the integer phase term in a recursive manner for each of a plurality of frequency domain samples of the CAZAC sequence;

a mapper configured to map the resulting frequency domain representation of the CAZAC sequence to a pre-determined frequency location; and a transformator configured to transform the mapped frequency domain representation into the time domain to obtain a time domain representation of the SC-FDMA signal.

15. The apparatus of claim 14, further comprising a storage with a look-up table, wherein the generator is configured to determine an individual frequency domain sample of the CAZAC sequence based on the integer phase term calculated for this sample by accessing the look-up table using the integer phase term as an input parameter.

16. A user terminal comprising the apparatus of claim 14, the user terminal being configured to support SC-FDMA.

* * * * *